United States Patent
Hewett

(10) Patent No.: US 11,543,512 B2
(45) Date of Patent: Jan. 3, 2023

(54) SYSTEMS AND METHODS FOR RFID TAG LOCATING USING CONSTRUCTIVE INTERFERENCE

(71) Applicant: Automaton, Inc., San Diego, CA (US)

(72) Inventor: Spencer Hewett, New York, NY (US)

(73) Assignee: Automaton, Inc., San Diego, CA (US)

( * ) Notice: Subject to any disclaimer, the term of this patent is extended or adjusted under 35 U.S.C. 154(b) by 0 days.

(21) Appl. No.: 17/127,039

(22) Filed: Dec. 18, 2020

(65) Prior Publication Data

US 2021/0173073 A1   Jun. 10, 2021

Related U.S. Application Data

(63) Continuation of application No. 16/508,448, filed on Jul. 11, 2019, now Pat. No. 10,871,558, which is a
(Continued)

(51) Int. Cl.
*G01S 13/74* (2006.01)
*G01S 13/86* (2006.01)
(Continued)

(52) U.S. Cl.
CPC ............ *G01S 13/74* (2013.01); *G01S 5/0215* (2013.01); *G01S 5/0263* (2013.01);
(Continued)

(58) Field of Classification Search
None
See application file for complete search history.

(56) References Cited

U.S. PATENT DOCUMENTS 5,267,334 A   11/1993   Normille et al.
7,327,383 B2   2/2008   Valleriano et al.
(Continued)

FOREIGN PATENT DOCUMENTS

CN   103033180 A   *   4/2013
CN   203216498 U   *   9/2013
(Continued)

OTHER PUBLICATIONS

Al-Kassab et al.,"RFID-enabled business process intelligence in retail stores: a case report." Journal of theoretical and applied electronic commerce research 8, No. 2 (2013): 112-137.
(Continued)

*Primary Examiner* — Mohammed Rachedine
(74) *Attorney, Agent, or Firm* — Smith Baluch LLP

(57) ABSTRACT

A system and method for locating radio-frequency identification tags within a predetermined area. The method can incorporate sub-threshold superposition response mapping techniques, alone, or in combination with other methods for locating radio-frequency identification tags such as but not limited to time differential on arrival (TDOA), frequency domain phase difference on arrival (FD-PDOA), and radio signal strength indication (RSSI). The system can include a plurality of antennas dispersed in a predefined area; one or more radio-frequency identification tags; a radio-frequency transceiver in communication with said antennas; a phase modulator coupled to the radio-frequency transceiver; and a system controller in communication with said transceiver and said phase modulator. Calibration techniques can be employed to map constructive interference zones for improved accuracy.

23 Claims, 7 Drawing Sheets

Related U.S. Application Data continuation of application No. 15/493,440, filed on Apr. 21, 2017, now Pat. No. 10,386,474, which is a continuation of application No. PCT/US2015/057206, filed on Oct. 23, 2015.

(60) Provisional application No. 62/067,736, filed on Oct. 23, 2014.

(51) Int. Cl.
  *G01S 13/46* (2006.01)
  *G01S 5/02* (2010.01)
  *G01S 11/02* (2010.01)

(52) U.S. Cl.
  CPC ........... *G01S 11/026* (2013.01); *G01S 13/867* (2013.01); *G01S 2013/462* (2013.01); *G01S 2013/466* (2013.01); *G01S 2013/468* (2013.01)

(56) References Cited

U.S. PATENT DOCUMENTS

| | | |
|---|---|---|
| 7,436,306 B2 | 10/2008 | Berger et al. |
| 7,436,309 B2 | 10/2008 | Koele |
| 7,520,424 B2 | 4/2009 | Haberler |
| 7,652,576 B1 | 1/2010 | Crossno et al. |
| 7,667,652 B2 | 2/2010 | Gevargiz et al. |
| 7,760,095 B2 | 7/2010 | Murrah |
| 8,094,026 B1 | 1/2012 | Green |
| 8,184,154 B2 | 5/2012 | Estevez et al. |
| 8,350,675 B2 | 1/2013 | Riechel |
| 8,441,354 B2 | 5/2013 | Padmanabhan et al. |
| 8,847,739 B2 | 9/2014 | Wilson et al. |
| 9,036,028 B2 | 5/2015 | Buehler |
| 9,111,156 B2 | 8/2015 | Sadr et al. |
| 9,183,717 B1 | 11/2015 | Diorio et al. |
| 9,311,799 B2 | 4/2016 | Jain et al. |
| 9,652,912 B2 | 5/2017 | Fadell et al. |
| 9,664,510 B2 | 5/2017 | Nathan et al. |
| 10,013,860 B2 | 7/2018 | Hewett |
| 10,386,474 B2 | 8/2019 | Hewett |
| 10,871,558 B2 | 12/2020 | Hewett |
| 2001/0049636 A1 | 12/2001 | Hudda et al. |
| 2004/0143505 A1 | 7/2004 | Kovach |
| 2004/0169587 A1 | 9/2004 | Washington |
| 2004/0228503 A1 | 11/2004 | Cutler |
| 2005/0008199 A1 | 1/2005 | Dong et al. |
| 2005/0185544 A1 | 8/2005 | Berger |
| 2005/0190098 A1* | 9/2005 | Bridgelall ............ G01S 13/878 342/146 |
| 2005/0206555 A1* | 9/2005 | Bridgelall ............ G01S 13/74 340/8.1 |
| 2005/0242926 A1 | 11/2005 | Berger |
| 2005/0263592 A1 | 12/2005 | Berger et al. |
| 2006/0027646 A1 | 2/2006 | Haberler |
| 2006/0177291 A1 | 8/2006 | Kienzl et al. |
| 2006/0187053 A1 | 8/2006 | Koele |
| 2006/0206704 A1 | 9/2006 | Gauby et al. |
| 2007/0001808 A1 | 1/2007 | Kastelic et al. |
| 2007/0073513 A1 | 3/2007 | Posamentier |
| 2007/0235527 A1 | 10/2007 | Appleyard et al. |
| 2008/0143482 A1 | 6/2008 | Shoarinejad et al. |
| 2008/0243626 A1 | 10/2008 | Stawar et al. |
| 2009/0012704 A1 | 1/2009 | Franco et al. |
| 2010/0001842 A1 | 1/2010 | Duron et al. |
| 2010/0039228 A1 | 2/2010 | Sadr et al. |
| 2010/0045436 A1 | 2/2010 | Rinkes |
| 2010/0148985 A1 | 6/2010 | Lin et al. |
| 2010/0156651 A1 | 6/2010 | Broer |
| 2010/0201520 A1 | 8/2010 | Stern et al. |
| 2010/0208039 A1 | 8/2010 | Stettner |
| 2010/0287057 A1 | 11/2010 | Aihara et al. |
| 2011/0071921 A1 | 3/2011 | Crespo et al. |
| 2011/0080267 A1* | 4/2011 | Clare .................. G06K 7/0008 340/10.4 |
| 2011/0133905 A1 | 6/2011 | Hussain et al. |
| 2011/0134240 A1 | 6/2011 | Anderson et al. |
| 2011/0145093 A1 | 6/2011 | Paradise et al. |
| 2011/0199211 A1 | 8/2011 | Campero et al. |
| 2012/0044054 A1 | 2/2012 | Hussain et al. |
| 2012/0094683 A1 | 4/2012 | Yoeli |
| 2013/0154802 A1 | 6/2013 | O'haire et al. |
| 2013/0201003 A1 | 8/2013 | Sabesan et al. |
| 2013/0202003 A1 | 8/2013 | Kakizaki et al. |
| 2013/0233922 A1 | 9/2013 | Schoening et al. |
| 2014/0035731 A1 | 2/2014 | Chan et al. |
| 2014/0159869 A1 | 6/2014 | Zumsteg et al. |
| 2014/0361078 A1 | 12/2014 | Davidson |
| 2015/0039458 A1 | 2/2015 | Reid |
| 2015/0122886 A1 | 5/2015 | Koch |
| 2015/0199890 A1 | 7/2015 | Hewett et al. |
| 2016/0126753 A1 | 5/2016 | Wight et al. |
| 2017/0116443 A1 | 4/2017 | Bolic et al. |
| 2017/0149294 A1 | 5/2017 | Wight et al. |
| 2018/0276963 A1 | 9/2018 | Hewett |

FOREIGN PATENT DOCUMENTS

| | | | |
|---|---|---|---|
| CN | 103927900 A * | 7/2014 | |
| CN | 203775285 U | 8/2014 | |
| DE | 102004025663 A1 | 12/2005 | |
| DE | 102004055931 A1 | 6/2006 | |
| DE | 102006007776 A1 | 8/2007 | |
| DE | 102008063981 A1 | 5/2010 | |
| DE | 102009016557 A1 | 10/2010 | |
| EP | 1573645 A1 | 9/2005 | |
| EP | 1658575 A1 | 5/2006 | |
| EP | 1821236 A2 | 8/2007 | |
| EP | 1658575 B1 | 12/2007 | |
| EP | 1821236 A3 | 8/2008 | |
| EP | 2239683 A1 | 10/2010 | |
| EP | 2239683 B1 | 7/2013 | |
| KR | 1020060010683 A | 2/2006 | |
| WO | 2005024703 A1 | 3/2005 | |
| WO | WO-2011135328 A2 * | 11/2011 | ............. G01S 13/84 |
| WO | 2014146132 A3 | 10/2014 | |
| WO | 2014203041 A1 | 12/2014 | |

OTHER PUBLICATIONS

Aryal, "Integrating Camera Recognition and RFID System for Assets Tracking And Warehouse Management." (2012). 41 pages.
Baraniuk et al., "Model-based compressive sensing." IEEE Transactions on Information Theory, 56, No. 4 (2010): 1982-2001.
Dardari et al., "Ultrawide bandwidth RFID: The next generation?." Proceedings of the IEEE 98, No. 9 (2010):1570-1582.
Donoho, "Compressed sensing." IEEE Transactions on Information Theory, vol. 52, No. 4 (2006): 1289-1306.
Ettus Research Universal Software Radio Peripheral. Accessed at http://ettus.com on Sep. 9, 2019, 4 pages.
Fossorier et al., "Reduced complexity iterative decoding of low-density parity check codes based on belief propagation." IEEE Transactions on Communications, vol. 47, No. 5 (1999): 673-680.
INDYK, Tutorial on Compressed Sensing (or Compressive Sampling, or Linear Sketching). Princeton 2008. Available at http://people.csail.mit.edu/indyk/princeton.pdf, 15 pages.
IntelliVision—AI and Video Analytics for Smart Cameras. Accessed at https://www.intelli-vision.com/ on Sep. 4, 2019. 7 pages.
International Search Report and Written Opinion, PCT/US2018/024950, 20 pages (dated Aug. 1, 2018).
International Search Report dated Apr. 5, 2016 in international Application No. PCT/US2015/057206, 13 pages.
International Search Report dated Mar. 15, 2013 in international Application No. PCT/US2012/060123, 12 pages,.
Lee et al., "An enhanced dynamic framed slotted ALOHA algorithm for RFID tag identification." The Second Annual International Conference on Mobile and Ubiquitous Systems: Networking and Services. IEEE, 2005, 7 pages.
Li et al., "IDCam: Precise Item Identification for AR Enhanced Object Interactions." 2019 IEEE International Conference on RFID (RFID). IEEE, 2019. 7 pages.

(56) References Cited

OTHER PUBLICATIONS

Mceliece et al., "Turbo decoding as an instance of Pearl's belief propagation algorithm." IEEE Journal on Selected Areas in Communications, vol. 16, No. 2 (1998): 140-152.
Mojix Technology Breakthrouhs. Mojix Inc Oct. 23, 2015. Accessed at http://www.mojix.com/learn_the_difference/technology.php, 4 pages.
Palanki, et al., "Rateless codes on noisy channels." In IEEE International Symposium on Information Theory, pp. 37-37. 2004.
Ramakrishnan et al., "Performance benchmarks for passive UHF RFID tags." MMB 2006 (2006). , 100 pages.
Raman et al., "Execution: The missing link in retail operations." California Management Review 43.3 (2001): 136-152.
Retailer Boosts Sales 14%, Cuts Inventory Management Costs 35% with RFID Solution. Microsoft Customer Solution Retail Industry Case Study. Sep. 2009. Available at http://download.microsoft.com/download/5/4/1/541AF3C9-BD73-4A91-BF7C-ACE0DBF78235/XterpriseAmericanApparelCaseStudy.pdf, 6 pages.
RFID essentials. O'Reilly Media, Inc. Bill Glover, Himanshu Bhatt, 2006 ISBN 0-596-00944-5, pp. 88-89. 4 Pages (including front matter).
Roberti, RFID Delivers Unexpected Benefits at American Apparel. RFID Journal Oct. 5, 2011, 2 pages.
Shih et al. "Taxonomy and survey of RFID anti-collision protocols." Computer Communications 29, No. 11 (2006): 2150-2166.
Vaswani, "LS-CS-residual (LS-CS): compressive sensing on least squares residual." IEEE Transactions on Signal Processing, vol. 58, No. 8 (2010): 4108-4120.
Wang et al., "Efficient and reliable low-power backscatter networks." ACM SIGCOMM Computer Communication Review 42, No. 4 (2012): 61-72.
Weiss et al., "On the optimality of solutions of the max-product belief-propagation algorithm in arbitrary graphs." IEEE Transactions on Information Theory, vol. 47, No. 2 (2001): 736-744.
Zhang et al., A batteryless computational RFID and sensing platform. Tech Report UMASS, 2011. Accessed at http://spqr.cs.umass.edu/moo/. 4 pages.
Zhuang et al., "Adaptive key frame extraction using unsupervised clustering." In Image Processing, 1998. ICIP 98. Proceedings. vol. 1, pp. 866-870. IEEE, 1998.

\* cited by examiner

PRIOR ART

Step 1

Step 2

RSSI-1→d1    RSSI-2→d2    RSSI-3→d3
d1,d2,d3 + antenna loc.→ tag loc.

Step 3

Pattern 1, detection
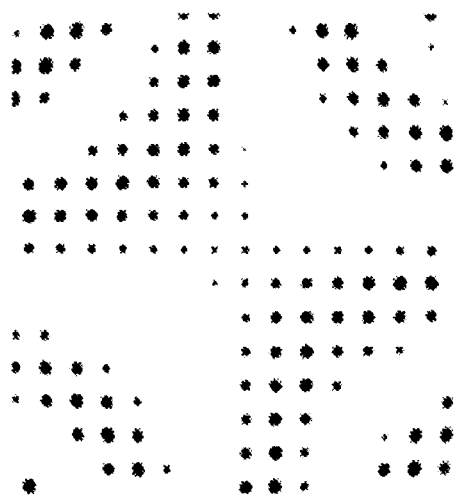
−
Pattern 2, NO detection
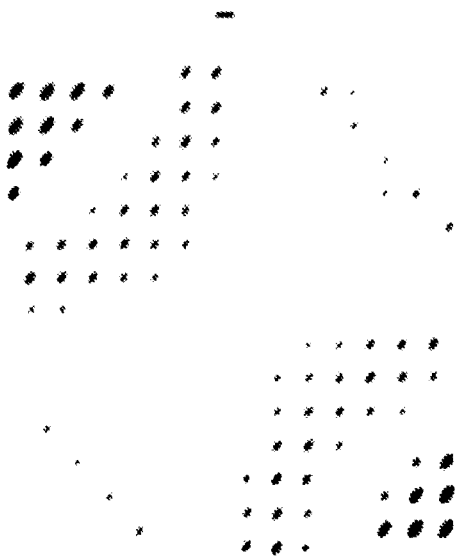
FIGURE 6
=
Pattern 1, Pattern 2 subtracted
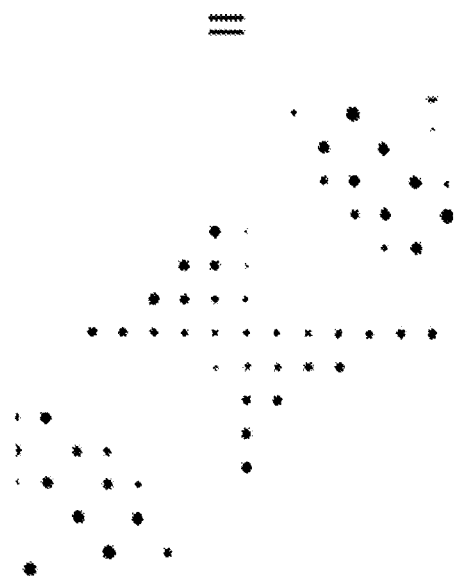

SYSTEMS AND METHODS FOR RFID TAG LOCATING USING CONSTRUCTIVE INTERFERENCE

RELATED APPLICATIONS

This application is a continuation of U.S. application Ser. No. 16/508,448, entitled "Systems and Methods for RFID Tag Locating Using Constructive Interference," filed Jul. 11, 2019, which is a continuation of U.S. application Ser. No. 15/493,440, now U.S. Pat. No. 10,871,558, entitled "Systems and Methods for RFID Tag Locating Using Constructive Interference," filed Apr. 21, 2017, which in turn is a bypass continuation of International Application No. PCT/US2015/057206, entitled "Systems and Methods for RFID Tag Locating Using Constructive Interference," filed Oct. 23, 2015, which in turn claims priority to U.S. Provisional Application No. 62/067,736, entitled "System and Methods for RFID Tag Locating Using Constructive Interference," filed Oct. 23, 2014. Each of these applications is herein incorporated by reference in its entirety and for all purposes.

TECHNICAL FIELD

This invention relates generally to the wireless communications field, and more specifically to new and useful systems and methods for using constructive interference such as use in radio frequency identification tag (RFID) tag locating.

BACKGROUND

Being able to identify and track objects as they move throughout buildings or other indoor areas with high precision is important for a wide variety of applications. Systems designed to track objects in this way, often called real-time locating systems (RTLS), find use in manufacturing, warehousing, retail inventory management, and medicine, to name a few areas. Unfortunately, current methods of tag locating used by RTLS are frequently associated with cost and/or usability issues. Thus, there is the need in the wireless communications field to create systems and methods for RFID tag locating. This invention provides such new and useful systems and methods.

SUMMARY

The present disclosure relates to a system for radio-frequency identification tag locating and associated methods.

In accordance with an aspect disclosed herein, there is set forth a method for locating a radio-frequency identification tag, comprising analyzing first and second response signals received via a plurality of antennas from the radio-frequency identification tag and determining a position of the radio-frequency identification tag based upon said analyzing. In some embodiments, the determining can be accomplished through triangulation.

In some embodiments of the method, the analyzing further comprises transmitting an initial activation signal from one of the plurality of antennas dispersed in a predefined area; and receiving a first response signal from the radio-frequency identification tag via the plurality of antennas.

In some embodiments of the method, said transmitting comprises transmitting via the selected antenna selected from among the plurality of antennas.

In some embodiments, said transmitting comprises transmitting via the selected antenna selected from among the plurality of antennas being dispersed in a predefined geographic area.

In some embodiments of the method, said analyzing comprises altering a transmission signal property of the initial activation signal, transmitting a secondary activation signal with the altered property; and receiving a second response signal from the radio frequency identification tag via the plurality of the antennas.

In some embodiments of the method, said receiving of the second response signal is conducted via the antennas.

In some embodiments, said transmitting the secondary activation signal comprises broadcasting a plurality of sub-threshold radio-frequency identification signals to create a constructive interference pattern within the predefined area.

In some embodiments, said transmitting comprises transmitting the plurality of sub-threshold radio-frequency identification signals via separate antennas.

In some embodiments of the method, said altering of the transmission signal property of the initial activation signal includes adjusting a power level of the secondary activation signal such that only a selected radio-frequency identification tag located in an area of constructive interference will transmit the second response signal. The method further comprises altering at least one of antenna power and a phase of the secondary activation signal to produce a second, but partially overlapping, area of constructive interference.

In some embodiments of the method, said receiving includes: receiving a radio signal strength indication from a plurality of radio-frequency identification tag; and identifying only a selected tag located in a first area of constructive interference due to a strength of the received radio signal strength indication.

In some embodiments of the method, said receiving includes: calculating a read probability for a selected tag to respond when queried; and using the calculated read probability to locate the selected tag.

In some embodiments, the method further comprises mapping a response pattern for the predefined area that compensates for environmental and structural interference.

In some embodiments, said mapping includes traversing the predefined area with a robot with an attached radio-frequency identification tag, transmitting a plurality of calibration signals via the plurality of antennas at respective power levels and phases, and comparing a predetermined location of the robot with a triangulated position of the attached radio-frequency identification tag.

In some embodiments, the mapping further comprises comparing the predetermined location of the robot to a predicted constructive interference zone, comparing constructive interference data to predicted interference data, and adjusting at least one of signal power or phase of the secondary activation signal until the constructive interference data matches the predicted interference data.

In some embodiments, the method further comprises disposing a calibration radio-frequency identification tag on a person; determining a location of the person as the person traverses the predetermined area; comparing the location of the person to a predicted constructive interference zone; comparing constructive interference data to predicted interference data; and adjusting at least one of signal power or phase of the secondary activation signal until the constructive interference data matches the predicted interference data.

In some embodiments, the location of the person is determined using a camera.

In some embodiments, the camera can be any one of an RGB camera, a monochrome visible light camera, a 3-dimensional camera, an infrared camera, and an ultra violet camera.

In some embodiments, the method further comprises determining a volume occupied by a person and an associated object.

In some embodiments, the volume occupied by a person and an associated object informs a targeted constructive interference pattern.

In some embodiments, the camera can identify the presence of the radio-frequency identification tag or an object with a predefined volume.

In some embodiments, the method disclosed is employed in combination with at least one of other tag locating techniques. In some embodiments, the other techniques can include at least one of time difference of arrival, frequency domain phase difference on arrival, received signal strength indication measurement, and read probability measurement.

In some embodiments, the method includes receiving environmental data including at least one of air humidity, air temperature, an environmental noise level, and a signal indicating a presence of people or objects in the preselected area, and adjusting signal power or phase of the secondary activation signal based on the environmental data to generate a constructive interference pattern. Sensors can be used to determine the background environmental radiation level.

In some embodiments, the method further comprises converting the second response signal from the radio-frequency identification tag from an analog signal into a digital signal in order to identify a radio-frequency identification tag number.

In some embodiments of the method, said altering includes changing one or more of an antenna radio pattern, an antenna orientation, a signal transmission power level, a frequency of the activation signal, a phase of the activation signal, and a beam-width of the activation signal to modify a constructive interference patterns.

In some embodiments, the method further comprises using historical radio-frequency identification tag location data to further refine the constructive interference pattern.

In some embodiments, the method further comprises calculating a velocity of a moving radio-frequency identification tag; predicting a new location of the moving radio-frequency identification tag based on the velocity of the moving radio-frequency identification tag; and altering the phase of the secondary activation signal based on the new location of the radio-frequency identification tag.

In accordance with an aspect disclosed herein, there is set forth a system for locating a radio-frequency identification tag, comprising a plurality of antennas dispersed in a predefined area; one or more radio-frequency identification tags dispersed within the predefined area; a radio-frequency transceiver in communication with said antennas; a phase modulator electrically coupled to the radio-frequency transceiver; and a system controller in communication with said transceiver and said phase modulator.

In some embodiments, the system controller enables sub-threshold superposition response mapping to calculate the location of the radio-frequency tags within the predefined area.

In some embodiments, the plurality of antennas can comprise any one of the following antenna types including a patch antenna, a reflected antenna, a wire antenna, a bow-tie antenna, an aperture antenna, a loop-inductor antenna, and a fractal antenna.

In some embodiments, the plurality of antennas can comprise more than one type of antenna. In some embodiments, the plurality of antennas are connected directly to the radio-frequency transceiver. In some embodiments of the system, the plurality of antennas are connected to the radio-frequency transceiver through one or more antenna splitters.

In some embodiments of the system, the plurality of antennas are capable of both transmission and reception of signals from the radio-frequency identification tags. In some other embodiments, the plurality of antennas are capable only of transmission or reception of signals.

In some embodiments of the system, the radio-frequency transceiver is capable of transmitting and receiving signals in a 900 megahertz frequency band.

In some embodiments, the radio frequency transceiver is capable of modulating a power level of a transmission signal.

In some embodiments, the system controller can calculate a location of a radio-frequency identification tag from radio-frequency identification response data.

In some embodiments, the system controller can store maps of constructive interference patterns of a predetermined location in a storage device.

In accordance with an aspect disclosed herein there is set forth a method for mapping a response pattern for a predefined area compensating for environmental and structural interference, comprising traversing the predefined area with a robot with an attached radio-frequency tag; transmitting a plurality of calibration signals at respective power levels and phases via a plurality of antennas disposed in the predefined area; and comparing a predetermined location of the robot with a triangulated position of the attached radio-frequency identification tag.

In some embodiments, the method further comprises comparing the predetermined location of the robot to a predicted constructive interference zone; comparing constructive interference data to predicted interference data; and adjusting at least one of signal power or phase of the secondary activation signal until the constructive interference data matches the predicted interference data.

In some embodiments, the method further comprises disposing a calibration radio-frequency identification tag on a person; determining a location of the person as the person traverses the predetermined location; comparing the location of the person to a predicted constructive interference zone; comparing constructive interference data to predicted interference data; and adjusting at least one of signal power or phase of the secondary activation signal until the constructive interference data matches the predicted interference data.

In some embodiments, the method further comprises saving constructive interference data to a database.

In accordance with an aspect disclosed herein, there is set forth a computer implemented method suitable for implementation on a processor comprising analyzing first and second response signals via a plurality of antennas from the radio-frequency identification tag; and triangulating a position of the radio-frequency identification tag based upon said analyzing, wherein said analyzing and triangulating are performed by a processor.

In some methods, said analyzing further comprises transmitting an initial activation signal from one of a plurality of antennas dispersed in a predefined area; receiving a first response signal from the radio-frequency identification tag via the plurality of the antennas.

In some embodiments of the method, said analyzing further includes altering a transmission signal property of the initial activation signal; transmitting a secondary activation signal with the altered property; and receiving a secondary response signal from the radio frequency identification tag via the plurality of the antennas.

In some embodiments of the method, said transmitting comprises transmitting the plurality of sub-threshold radio-frequency identification signals to create a constructive interference pattern within the predefined area.

In some embodiments, said transmitting comprises transmitting the plurality of sub-threshold radio-frequency identification signals via separate antennas.

In some embodiments, said altering includes adjusting a power level of the secondary activation signal such that only the selected radio-frequency identification tag located in an area of constructive interference will transmit the second response signal; and altering at least one of antenna power and a phase of secondary activation signal to produce a second, but partially overlapping, area of constructive interference.

In some embodiments, the method further comprises mapping a response pattern for the predefined area that compensates for environmental and structural interference.

In some embodiments, said mapping includes traversing the predefined area with a robot with an attached radio-frequency tag; transmitting a plurality of calibration signals via the plurality of antennas at respective power levels and phases; and comparing a predetermined location of the robot with a triangulated position of the attached radio-frequency identification tag.

In some embodiments, the method further comprises comparing the predetermined location of the robot to a predicted constructive interference zone; comparing constructive interference data to predicted interference data; and adjusting at least one of signal power or phase until the constructive interference data matches the predicted interference data.

In some embodiments, the method further comprises disposing a calibration radio-frequency identification tag on a person; determining a location of the person as the person traverses the predetermined area; comparing the location of the person to a predicted constructive interference zone; comparing constructive interference data to predicted interference data; and adjusting at least one of signal power or phase of the secondary activation signal until the constructive interference data matches the predicted interference data.

In some embodiments of the method, the location of the person is achieved using a camera.

In some embodiments of the methods, the camera can be any one of an RGB camera, a monochrome visible light camera, a 3-dimensional camera, an infrared camera, and an ultra violet camera.

One embodiment of the method, further comprises determining a volume occupied by a person and an associated object. In some embodiments, the volume occupied by a person and an associated object informs a targeted constructive interference pattern. In some embodiments of the method, the camera can identify the presence of the radio-frequency identification tag or an object with a predefined volume.

BRIEF DESCRIPTION OF THE FIGURES

FIG. 6 is an example view of constructive interference patterns generated by a system of a preferred embodiment.

Figure 1:
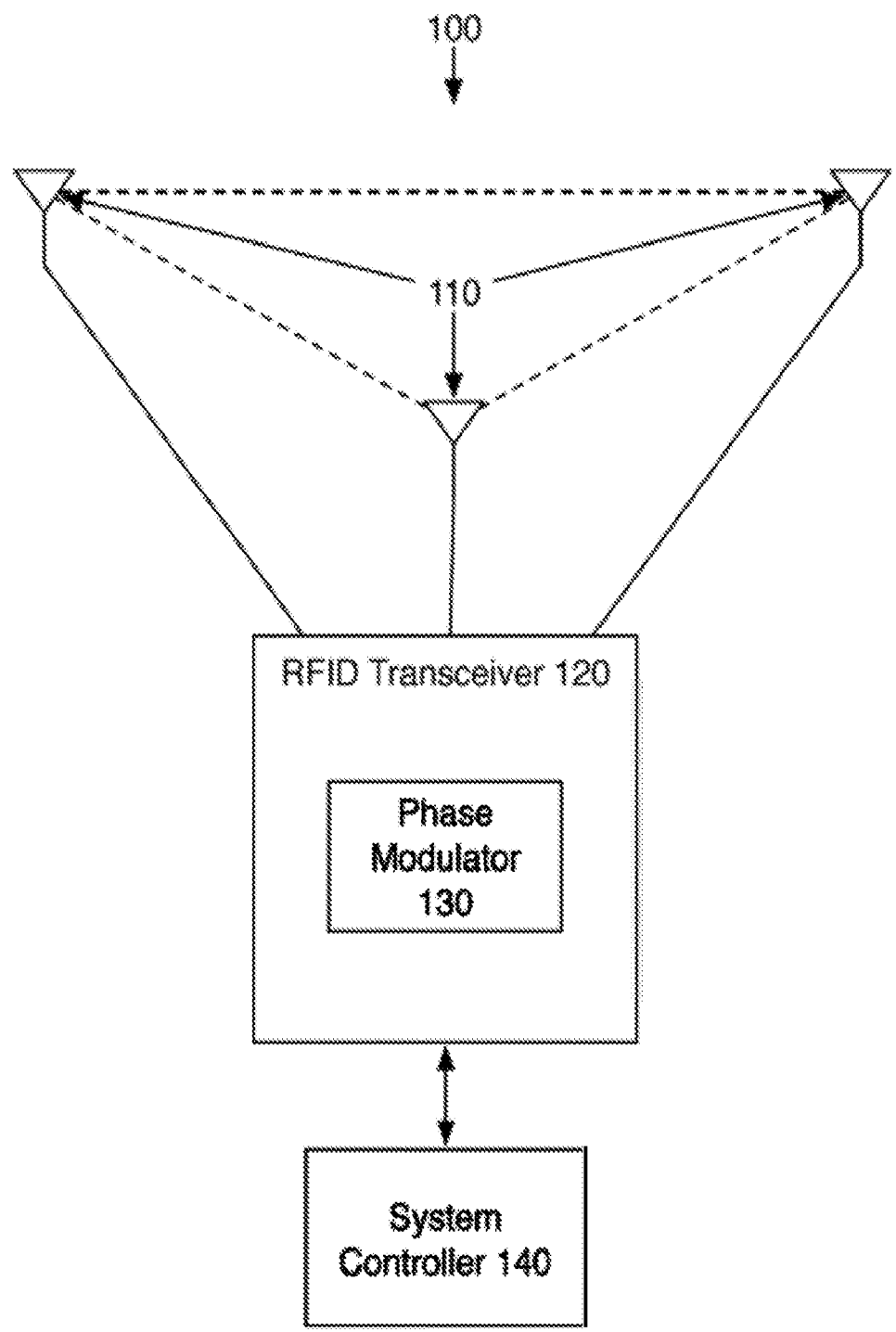
FIG. 1 is a diagram view of a system of a preferred embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. RFID Tag Locating System

As shown in FIG. 1, a radio-frequency identification (RFID) tag locating system 100 includes a plurality of antennas 110, an RFID transceiver 120, a phase modulator 130, and a system controller 140. The system 100 may additionally include one or more reference RFID tags 150.

The system 100 functions to locate RFID tags within a three-dimensional volume of interest (or a two-dimensional plane of interest). The system 100 preferably determines tag location across time in order to track changes in tag location and/or tag movement. The system 100 is preferably designed and used to locate ultra-high frequency (UHF) passive RFID tags, but may additionally or alternatively be designed and used to locate passive RFID tags operating on any frequency spectrum. Additionally or alternatively, the system 100 may also be used with active RFID tags or any other suitable devices capable of responding selectively based on received RF signal power.

Traditional RFID tag locating systems use one of several methods for tag location, including time difference of arrival (TDOA), phase difference of arrival (PDOA), and received signal strength indication (RSSI) measurement. All three of these methods can locate tags using trilateration.

In the case of TDOA, a signal is sent to an RFID tag from one of three antennas. The tag receives the signal and transmits a signal in response. The response signal is then received at all three of the antennas at different times. The time between original signal transmission and reception of the response signal at each antenna can be used to determine the distance from the tag to each antenna, which can then be used to locate the RFID tag (relative to the antennas) using trilateration. The TDOA method is not typically used for UHF RFID tags simply because typical time differences are very small (and bandwidth available is narrow).

There are several types of PDOA, including frequency domain PDOA (FD-PDOA). In FD-PDOA, a signal is sent to a tag from one of three antennas at a first frequency; the tag responds with a first response signal. Then the same antenna sends a signal at a second frequency (preferably close to the first frequency), and the tag responds with a second response signal. The phase difference between the first response signal and the second response signal (as measured at the first antenna) can give a distance from the tag to the first antenna. This process can be repeated for the other two antennas, producing three distances, which can be used to locate the tag using trilateration.

Figure 2:
FIG. 2 is a diagram view of a prior-art RSSI locating technique.
Figure 2:

In the case of RSSI measurement, as shown in FIG. 2, a signal is sent to an RFID tag from one (or more) of three antennas. The tag receives the signal and transmits a signal in response. The response signal is then received at all three of the antennas, each recording a different received signal strength (e.g., RSSI). The RSSI is used to estimate distance from each antenna, which can then be used to locate the tag relative to the antennas using trilateration. Since RSSI does not typically correspond well to distance, this method may suffer from accuracy issues.

Another method for locating RFID tags is known as read probability measurement, described in U.S. Provisional Patent Application No. 61/928,303, which is incorporated in its entirety by this reference. To briefly summarize, read probability measurement takes advantage of RFID tag power-on thresholds (that is, the minimum amount of power a passive RFID tag must receive in order to transmit a readable response signal). The antennas modulate transmission power and record whether the tag responds or not at each transmission power. A number of these transmissions are used together to calculate a read probability (the probability that a tag will be read versus transmission power). By comparing this to an estimate or analysis of how transmission signal power changes with distance (and potentially direction) for each transmission power, a distance from each antenna can be determined, and trilateration can be performed.

The system 100 preferably locates RFID tags using a method henceforth referred to as sub-threshold superposition response mapping (STSRM). This technique may be used independently of the method of RFID tag locating described previously, but may additionally or alternatively be used in conjunction with those methods.

As with previously described methods, STSRM (described in more detail in the description of the method 200) also involves the use of multiple antennas; however, the locating process is very different from previously described methods. In STSRM, multiple antennas transmit a signal at the same time. The signals transmitted by the antennas interfere with each other, creating areas of constructive interference and areas of destructive interference. Based on the relative location of antennas, signal properties of the signal emitted by each antenna (e.g., phase, polarization, beam width, etc.), and the environment (e.g., obstacles in between antennas and tags), the interference pattern generated by signals can be predicted. The power of each antenna can be adjusted such that only areas of strong constructive interference (preferably a sparse pattern) have enough power to activate RFID tags; in other words, the individual signals are sub-activation-threshold in areas of interest. If an RFID tag is activated, it must then lie in one of these areas of constructive interference. After an RFID tag is located within a constructive interference area, the constructive interference pattern is then changed (by altering antenna power and phase) to produce a different, but partially overlapping, set of constructive interference points. This process of altering patterns may proceed until the RFID tag has been confined to a single location.

Figure 3A:
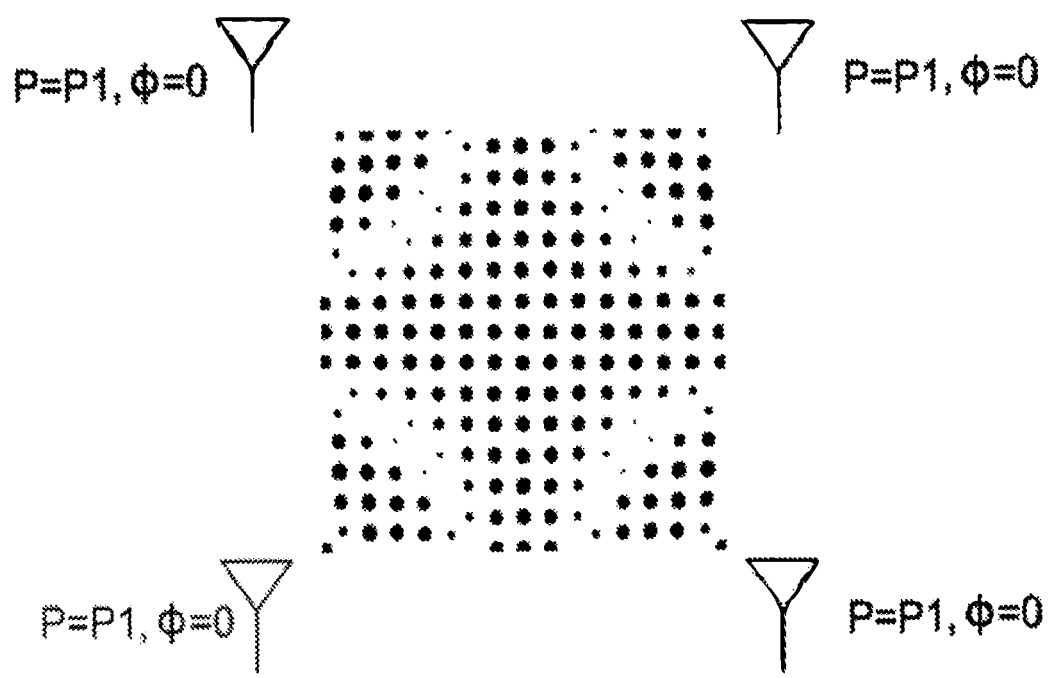
FIG. 3A is an example view of constructive interference patterns generated by a system of a preferred embodiment.
Figure 3B:
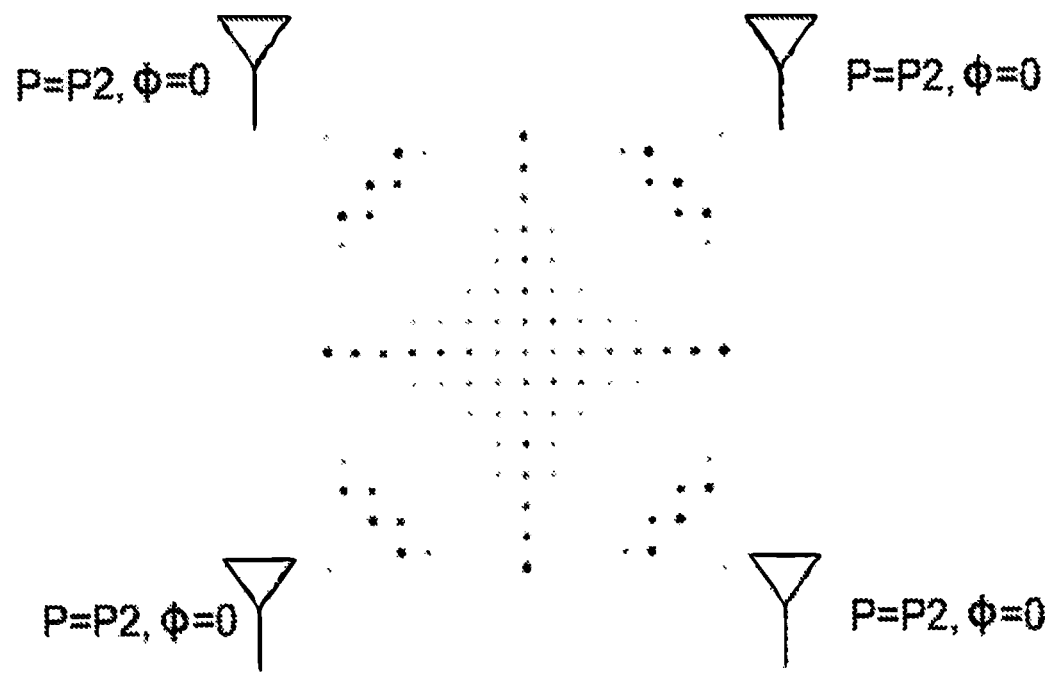
FIG. 3B is another example view of constructive interference pattern generated by a system of the preferred embodiment.
Figure 4A:
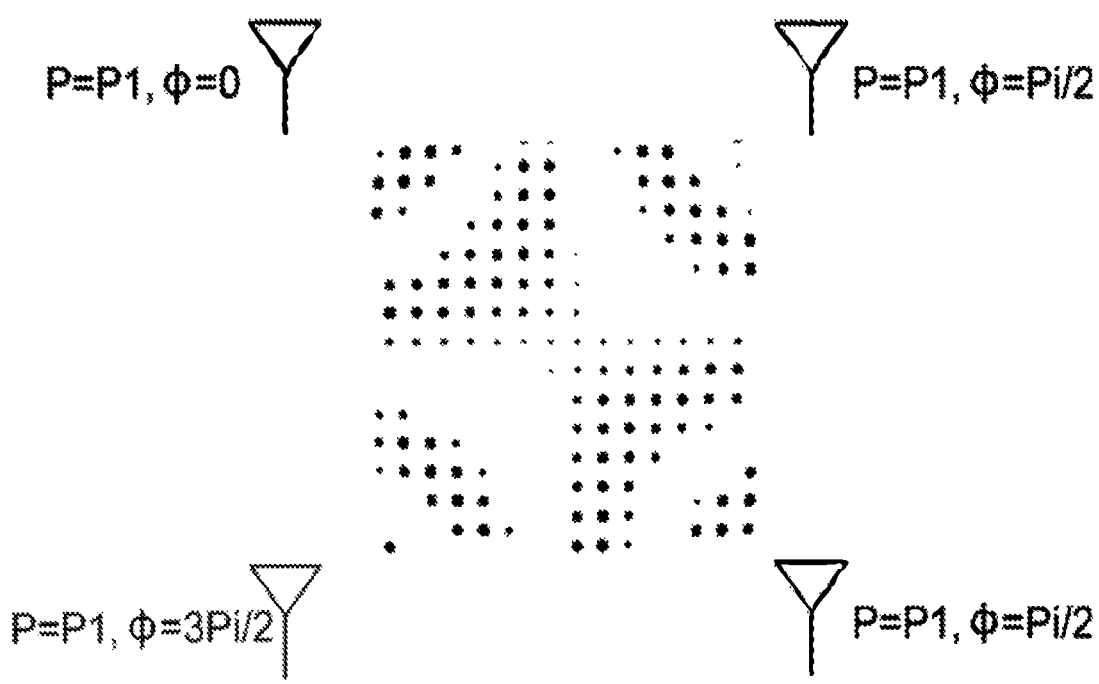
FIG. 4A is an example view of constructive interference patterns generated by a system of a preferred embodiment.
Figure 4B:
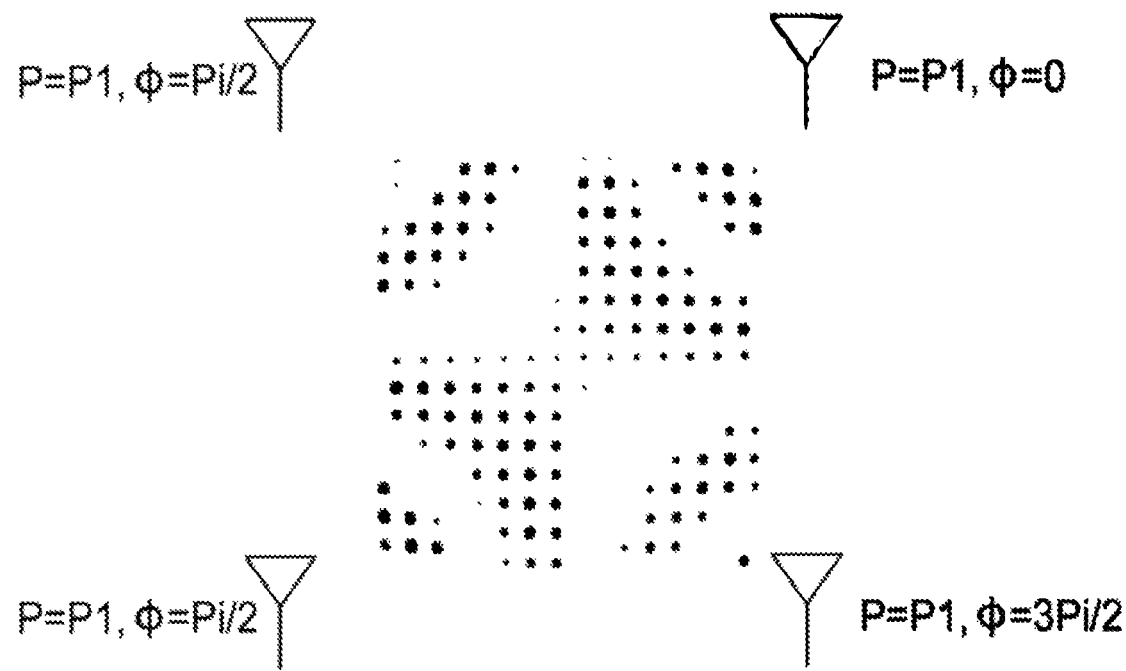
FIG. 4B is another example view of constructive interference patterns generated by a system of the preferred embodiment.

In other embodiments, instead of using power level for threshold for activation of tags inside the target zone, received signal strength indication (RSSI) measurement can be used. Outside the constructive interference zone, there will be a marked decrease in RSSI. The varied RSSI signal levels can produce a steep gradient for tags located inside and outside the zone. This difference in RSSI can be used to eliminate tags located outside the target zone. For tags that are located on the boundary of a constructive interference zone, other techniques can be utilized to determine whether the tag is located inside or outside the zone. Examples of the constructive interference patterns produced during STSRM are as shown in FIGS. 3A and 3B. FIGS. 3A and 3B include field contour plots, where field strength above a threshold is displayed as black and field strength below the threshold is displayed as white. In these examples, the plot threshold is chosen to be an RFID tag threshold; that is, RFID tags will only have enough power to respond to transmitted signals if they are in black areas. The examples shown in FIG. 3A and FIG. 3B are identical except for transmission power; P2<P1. Because P2 is lower, fewer points in the area of interest are super-threshold (and thus potential locating resolution is higher). More examples are as shown in FIGS. 4A and 4B; in these examples, the transmission power is the same between FIGS. 4A and 4B, but the relative phase of antennas is different. Note that all of these examples assume a uniform transmission media (e.g., air) and no reflections; these factors are often important in determining real-world constructive interference patterns.

The locating process as described above discusses localization using only STSRM, but the technique may additionally or alternatively be used with other techniques to narrow the search field (i.e., how many patterns must be tested) or for other purposes. For example, read probability measurement may place an RFID tag within a 1×1 meter area with 95% accuracy, and STSRM could be used to further narrow down location within this area.

The nature of constructive interference is that with multiple signals traveling in different directions, effects can be highly localized (on order of signal wavelength). Further, altering of phase can displace interference peaks by magnitudes substantially smaller than wavelength, meaning that STSRM is capable of achieving very high accuracy in locating RFID tags.

The system 100 preferably enables the use of STSRM techniques to locate RFID tags; additionally or alternatively, the system 100 may enable the use of other tag locating techniques in combination with or complementary to STSRM techniques.

The antennas 110 function enable the system 100 to transmit signals to RFID tags and receive signals from the RFID tags. The antennas 110 convert conducted electric power into RF waves and/or vice versa, enabling the transmission and/or reception of RF communication. The antennas 110 are preferably made out of a conductive material (e.g. metal). The antennas 110 may additionally or alternatively include dielectric materials to modify the properties of the antennas 110 or to provide mechanical support.

The antennas 110 may be of a variety of antenna types; for example, patch antennas (including rectangular and planar inverted F), reflector antennas, wire antennas (including dipole antennas), bow-tie antennas, aperture antennas, loop-inductor antennas, and fractal antennas. The plurality of antennas 110 can additionally include one or more type of antennas, and the types of antennas can include any suitable variations.

The antenna 110 structure may be static or dynamic (e.g. a wire antenna that includes multiple sections that may be electrically connected or isolated depending on the state of the antenna).

Antennas 110 may have isotropic or anisotropic radiation patterns (i.e., the antennas may be directional). If antennas 110 are directional, their radiation pattern may be dynamically alterable; for example, an antenna 110 substantially emitting radiation in one direction may be rotated so as to change the direction of radiation.

The plurality of antennas 110 are preferably connected directly to RFID transceivers 120 with conductive wires, but may additionally or alternatively be connected to transceivers through any suitable method. The antennas 110 may be connected directly to RFID transceivers 120, or may be connected RFID transceivers 120 through one or more antenna splitters.

The system 100 preferably includes at least three antennas 110, so as to be able to perform trilateration, but the system may additionally include any suitable number of antennas. In one implementation of the system 100, the system 100 includes a rectangular grid of antennas 110. Other embodiments can selectively assign antennas to various roles. In one embodiment a fixed number of antennas can be tasked with targeting a particular zone, while other antennas can be assigned to reducing secondary effects interference from other power zones which can occur some distance away from the targeted zone.

The antennas 110 of the system 100 are preferably used both for transmission of signals to and reception of signals from RFID tags, but may additionally or alternatively antennas may be used only for transmission or only for reception.

Antennas 110 are preferably located as to provide coverage for a particular indoor area. For example, antennas 110 might be oriented in a rectangle on the ceiling of a store in order to locate RFID tags contained within the rectangle. In this particular implementation, of the two solutions produced by trilateration, only one would be valid (the assumption being that no RFID tags are present above the ceiling).

The RFID transceiver 120 functions to produce signals for transmission by the antennas 110, as well as to analyze signals received by the antennas 110 from RFID tags. In one embodiment, the RFID transceiver preferably includes an RF transmitter capable of sending signals in the 900 MHz band and an RF receiver capable of receiving signals in the 900 MHz band, but may additionally or alternatively be any suitable transceiver capable of communicating with RFID tags. The 900 MHz band supports 902-928 MHz in North America. Alternatively the transmitter can operate in the 800 MHz band. The 800 MHz band supports 865-968 MHz in Europe. Alternatively, the transceiver can operate in the industrial, scientific and medical (ISM) radio band from 2.4-2.485 (Bluetooth Band), 2.4 gigahertz (12 cm) UHF and 5 gigahertz (6 cm) SHF ISM radio bands, 3.1-10 GHz (microwave band), and other UHF RFID tag emitter bands in use or later developed.

The RFID transceiver 120 is preferably coupled directly to the antennas 110, but may additionally be coupled to the antennas 110 through an antenna splitter or through any other components.

The RFID transceiver 120 is preferably controlled by the system controller 140, but may additionally or alternatively be controlled by any other component of the system 100. The RFID transceiver 120 is preferably capable of modulating power to the antennas 110, additionally or alternatively, power modulation may be accomplished by a device external to the RFID transceiver 120 (e.g., an active splitter).

The phase modulator 130 functions to change the phase of the signal output by one or more antennas 110. Changing the phase of any one of the antennas 110 has the effect of changing the far-field interference pattern (and thus the areas that RFID tags may be activated in). The phase modulator 130 is preferably part of the RFID transceiver 120, but may additionally or alternatively be a component independent of the RFID transceiver 120.

If the phase modulator 130 is part of the RFID transceiver 120 and each antenna 110 (or antenna array) is connected to the RFID transceiver 120 individually (as shown in FIG. 1), the phase modulator 130 preferably changes phase simply by modifying the digital signal intended for a particular antenna. For example, the carrier wave of an RF signal transmitted by an antenna 110 might have the form of $\cos[\omega t+\phi]$, where $\phi$ represents an alterable phase shift. The phase modulator 130 may simply adjust the value of $\phi$ to provide the signal with a particular phase.

Figure 5:
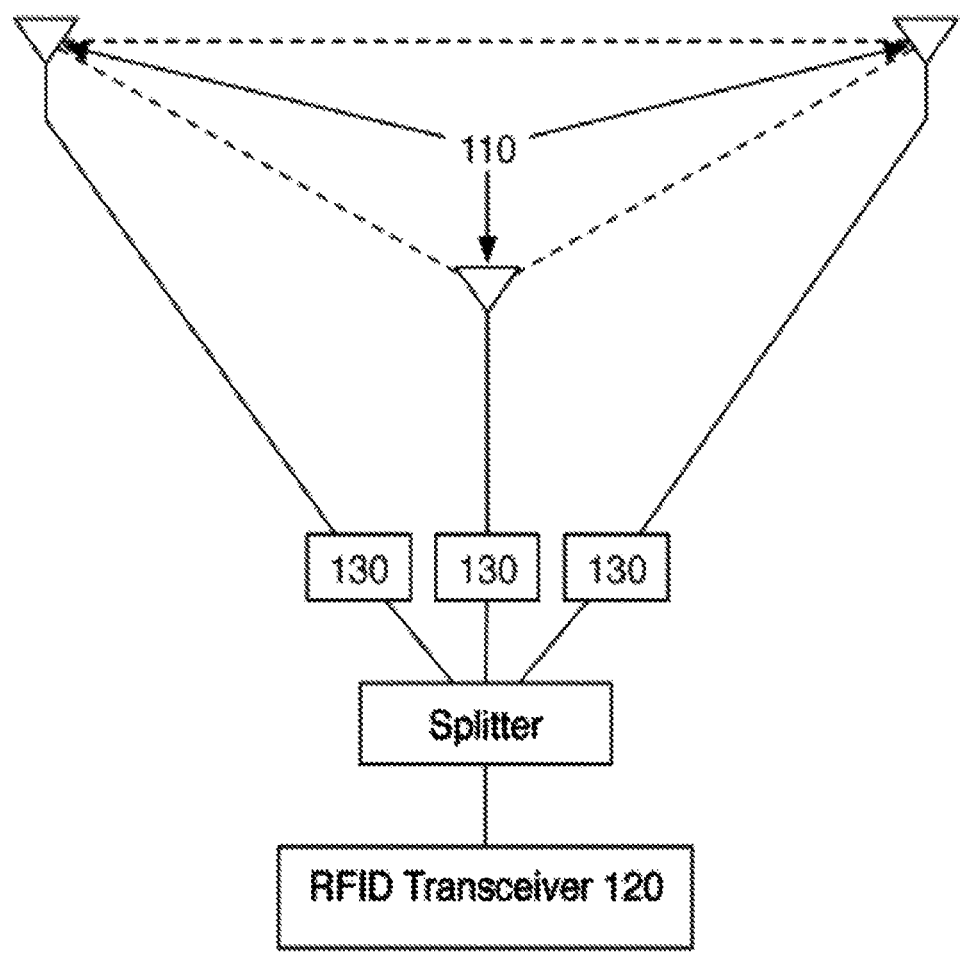
FIG. 5 is a diagram view of a system of a preferred embodiment.

If the phase modulator 130 is part of or after an antenna splitter, as shown in FIG. 5, or otherwise operates on the analog signals intended for the antennas 110 (as opposed to the previous example, where the phase modulator 130 operates in the digital domain), the phase modulator 130 may consist of variable delay circuits connected to the antennas 110. Additionally or alternatively, the phase modulator 130 may comprise any digital or analog circuit or component capable of altering the phase of the transmitted signals of one or more antennas 110.

The system controller 140 functions to control the output of the RFID transceiver 120 and the phase modulator 130, as well as to process the signals received by the RFID transceiver 120. The system controller 140 includes a microprocessor; the system controller 140 may be integrated with the RFID transceiver 120 and phase modulator 130, but may additionally or alternatively be separate of one or both of the RFID transceiver and phase modulator 130.

The system controller 140 enables the system 100 to transform RFID response data into a location for an RFID tag. The system controller 140 preferably accomplishes this transformation by using a mapping of constructive interference patterns to physical locations to estimate the coordinates at which signal power rises above some activation threshold. This process is described in more detail in the sections on the method 200.

The system controller 140 preferably includes a processor and storage for the above-mentioned maps, but may additionally or alternatively store map data and configuration data in any suitable location (e.g., cloud-based servers).

The system controller 140 preferably performs this transformation using stored maps. The system controller 140 may additionally or alternatively generate maps in real-time. These maps preferably allow the system controller to determine super-threshold areas of constructive interference based on transmission variables; for example, the location of antennas 110, the angle of orientation of antennas 110, the radiation pattern of antennas 110, the phase, frequency, polarization, and power of signals transmitted by the RFID transceiver 120 (via the antennas 110), or any other applicable data. The maps may additionally or alternatively vary based on environmental variables, for example, the number of people within the area of interest.

Constructive interference patterns may be strongly dependent on environment. For example, a change in positioning of shelves in a store might cause larges changes in the constructive interference pattern generated given a certain set of transmission parameters. For this reason, it may be helpful for the system controller 140 to have a calibration reference; for example, data defining how constructive interference patterns for a particular area.

The calibration references may be static; for instance, the calibration references may be formed by a robot with an RFID tag traversing an area; the robot maps out the area while the system 100 outputs one or more constructive interference patterns. The system 100 outputs constructive interference patterns by transmitting a signal from one or more antennas 110 at particular transmission powers and phases. The robot map may be, through time synchronization, matched up to points of RFID tag activation, this data set is then compared to constructive interference data predicted by the system controller 140. The system controller 140 may then adjust transmission variables (e.g., by adjusting transmission variable inputs to a prediction engine until prediction matches reality, or by adjusting actual transmission variable inputs until the robot output matches predictions). Static calibration processes may be performed in real-time with data gathering (e.g., as the robot moves around) or at a later time (using previously corrected data).

Similarly, a robot may be used to map read probabilities for various locations within an area. For example, a robot may be used to map out an area while the system 100 outputs signals from one antenna (or serially from multiple antennas). The robot map, through time synchronization, may be matched up to points of RFID tag activation; this data may then be used to calculate read probabilities as a function of position in the area. As in the previous process, the system controller 140 may adjust transmission variables to match predictions to reality or vice versa. Read probability calibration processes may be performed in real-time with data gathering (e.g., as the robot moves around) or at a later time (using previously corrected data).

The calibration references may additionally or alternatively be dynamic. In one example, the system 100 includes RFID reference tags 150 placed in known locations. These may be used to calibrate or recalibrate the system controller 140 mapping at any time. This allows the system 100 to be recalibrated easily when environmental factors (e.g., positioning of RF-signal-affecting objects, etc.) change. The system 100 preferably calibrates with references by predicting patterns that would activate particular reference tags, testing those patterns, and refining the patterns based on response or non-response.

Calibration may additionally or alternatively be performed with the aid of non-STSRM techniques. For example, persons in a particular area may carry RFID tags that identify them. If the position of the persons can be located with precision (e.g., by a camera, or by another method, such as detecting wireless transmissions from their cellphone), the RFID tags they carry could be used to calibrate the system 100. Cameras or other locating methods may additionally or alternatively be used at any point in order to refine or calibrate STSRM location data or the system 100.

For example, a camera (e.g., RGB camera, monochrome visible light camera, 3D camera, depth camera, infrared camera, or an ultra violet sensor etc.) could be used to recognize a person (either generically as a person, or as a particular person, using face recognition software, gait analysis, or another suitable technique). The camera may additionally or alternatively be used to calculate the volume occupied by the person and associated objects (e.g., a shopping cart). The location and volume occupied by the person and/or associated objects could be used to inform a particular constructive interference pattern; for example, to query RFID tags of objects contained within the person's bag or shopping cart. This could be used to determine particular items a person is carrying. Additionally or alternatively, location information, recognition data, visual data, or any other suitable camera data may be used in combination with STSRM data in any suitable manner in order to provide further information about the presence of RFID tags (or other objects) within a particular volume.

The system controller 140 may additionally or alternatively use the antennas 110 to perform calibration; for example, the system controller 140 may transmit a signal at a first antenna 110 and receive it at a second antenna 110. Because the relative locations of the antennas 110 are preferably known, the signal can be used to determine delay or phase shift due to environmental factors in the signal path. This information can be used to refine constructive interference pattern maps.

In addition to controlling the calibration process, the system controller 140 preferably controls the transmissions used for RFID tag location. The system controller 140 preferably adjusts phase and transmission power to locate RFID tags in a small number of iterations (e.g., by optimizing for a minimum number of iterations given rough knowledge about the position of a tag). For example, the system controller 140 may know from a previous search that a tag is located in a particular area. If analysis of historical data suggests that the tag is likely to be in the same area, the system controller 140 may attempt to isolate the search to this area before trying other areas. The system controller 140 storage may analyze historical data related to tag location in a number of ways. Historical data preferably includes historical environmental data, historical absolute location data (e.g., the tag's location in coordinate space), historical relative location data (e.g., the tag's location relative to other tags or other references), behavioral data (e.g., the tag is likely to be in the middle of the area during the afternoon, but near the left edge during the evening), or any other suitable data.

The system controller 140 preferably alters phase and transmission power of antennas 110 by controlling RF transceivers 120 and phase modulators 130, but may additionally or alternatively alter antenna phase and transmission power in any suitable manner.

The system controller 140 may locate RFID tags using only the STSRM method, but may additionally or alternatively locate RFID tags using a combination of methods; for instance, RSSI may be used to roughly locate RFID tags, and then STSRM may be used to locate RFID tags with higher resolution. If the system 100 performs multiple methods of tag locating, all methods are preferably directed by the system controller 140, but the system controller 140 may alternatively direct only a subset of locating methods.

The reference RFID tags 150 function to provide a calibration reference to the system 100. The reference RFID tags are preferably substantially similar to the RFID tags located by the system 100, but may additionally or alternatively any suitable type of RFID tag. The RFID tags preferably have a known tag identifier (i.e., the signal transmitted by the tag when interrogated) and a known position. Thus, when reference RFID tags 150 transmit, the system controller 140 can infer that the activation signal was above-threshold at the location of transmitting reference RFID tags.

Reference RFID tags are preferably associated with a location that is static relative to the antennas 110, but may additionally or alternatively be associated with a location in a different coordinate space. For example, reference RFID tags may be located with GPS coordinates, or with some particular object (e.g., a movable cart may contain a reference RFID tag so that positions may be determined relative to that cart).

Sub-threshold superposition response mapping (STSRM) techniques are not limited to the use of UHF radio frequency radiation. STRM techniques can be applied using ultrasound radiation. Ultrasound devices operate with frequencies from 20 kHz up to several gigahertz. Sound vibration can form constructive interference patterns similar to ultrahigh frequency radiation and STSRM techniques can be applied for the selective transmission of sound waves.

In addition to using constructive interference mapping techniques for the locating of RFID tags, these methods could be used for other targeted transmission and receipt of energy. Such applications include, the targeted transmission of radiation resulting in constructive interference zones for the targeted transmission of energy for specific areas. This could be used for selected areas for transmitting radiation for wireless, remote recharging of portable electronic devices. In this way, concentration of the radiation to selective areas would reduce the harmful effects of radiation on humans with isometric radiation.

Other uses included the selected targeting of areas for concentrated bandwidth distribution. In this way some areas would have higher bandwidth capabilities in these constructive interference zones than outside the constructive interference zones. In zones outside the target zone, the data rate would be significantly reduced.

Figure 7:
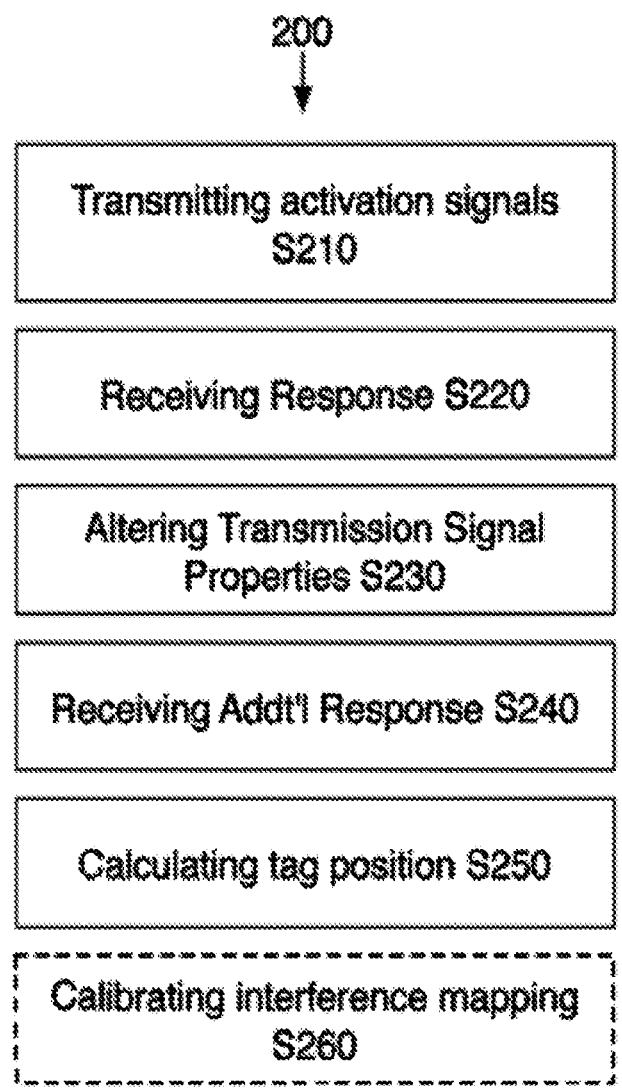
FIG. 7 is a chart view of a method of a preferred embodiment.

As shown in FIG. 7, a method 200 for sub-threshold superposition response mapping (STSRM) preferably includes transmitting a plurality of sub-threshold RFID activation signals from separate antennas S210, receiving a response signal from an RFID tag S220, altering transmission signal properties S230, receiving an additional response signal from the RFID tag S240, and calculating the RFID tag position S250. The method 200 may additionally include calibrating interference mapping S260.

The method 200 functions to locate RFID tags within a specific volume (bounded by antenna range). The method 200 preferably results in a more accurate location estimate than from typical methods (e.g., TDOA, PDOA, etc.).

Step S210 includes transmitting a plurality of sub-threshold RFID activation signals from separate antennas. Step S210 functions to create a constructive interference pattern within an area defined by the transmitting antenna range. The constructive interference pattern is a function of antenna and signal properties including antenna radiation pattern, antenna orientation, antenna type, transmission power, frequency, phase, beam-width, and other factors.

The locations of the antennas are preferably known relative to each other. Antennas may additionally or alternatively be referenced to any coordinate frame of reference.

The transmission power and relative phase of activation signals are preferably set based on an estimated constructive interference pattern, but may additionally or alternatively be based on any suitable instructions or data. The transmission power and relative phase of activation signals are preferably set such that only a small subset of the area covered by antenna range results in super-threshold signal power; that is, most of the area covered by antenna range does not have enough constructive interference to activate an RFID tag.

The particular power and phase settings chosen for each signal are preferably informed by historical data; that is, the interference pattern generated by Step S210 is preferably intended to activate tags in a particular subset of in-range area where the tags are assumed to be. Additionally or alternatively, the power and phase settings chosen by Step S210 may result from explicit settings (e.g., the first activation signals always have a relative phase of zero and a transmission power of 100 dBm), other data (e.g., data from other locating methods), or any other suitable instructions.

Step S210 may additionally or alternatively include receiving environmental data (e.g., humidity, presence of people or objects, temperature, environmental RF noise, etc.) or previous mapping information (e.g., a mapping of particular transmission settings to a constructive interference pattern). This data may be used to inform the transmission settings in order to more accurately generate particular constructive interference patterns. Previous mapping information or other calibration information preferably results from Step S260, but may additionally or alternatively come from any suitable source.

Step S220 includes receiving a response signal from an RFID tag. Step S220 functions to provide data that can be used to generate information about the RFID tag's location. Based on the transmission settings of Step S210 and the predicted mapping of signal strength (taking into account constructive interference), the location of the RFID tag may be confined to a set of points (or small areas) of constructive interference. Note that Step 210 may need to be iterated multiple times at different transmission settings before receiving a response signal from a particular RFID tag.

Step S220 preferably includes receiving an analog signal over one or more antennas; these antennas are preferably the same antennas used to transmit signal in Step S210, but may additionally or alternatively be any suitable antennas. This analog signal is preferably converted to a digital signal and analyzed to provide the locating system with the RF ID tag ID. Additionally or alternatively, if the tag identifier is not important to a particular application, the signal may not be converted (e.g., an application that only cares about locating any tag, not a specific tag).

Step S230 includes altering transmission signal properties. Step S230 functions to change the constructive interference pattern used to enable RFID tag responses. Step S230 may occur after Step S210 (if a desired tag is not located) or after Step S220 (to refine the location of a particular tag).

Step S230 preferably includes altering one or more of antenna radiation pattern, antenna orientation, signal transmission power, frequency, phase, and beam-width in order to alter constructive interference patterns.

The alterations made by Step S230 preferably are informed by existing data or estimates pertaining to an RFID tag's location; additionally or alternatively, alterations may be made according to a static instruction set or in any other suitable manner. For example, if analysis of data from Step S220 identifies an RFID tag as occupying a location in the first quadrant of a square area (i.e., x>0 and y>0) or in the third quadrant (x<0, y<0), and historical data suggests that the RFID tag is much more likely to be in the first quadrant, the alterations made by Step S230 may produce an interference pattern more likely to provide location information on a tag located in the first quadrant.

As a specific example of data pertaining to RFID tag location, the alterations made by Step S230 are preferably informed by the results of previous alterations. For example, as shown in FIG. 6, a first pattern may be generated by Step S210, resulting in tag detection in Step S220. Step S230 alters the transmission signal to produce a second pattern, which results in no detection. Assuming that the tag did not move significantly between the generation of pattern 1 and pattern 2, the tag must be located in the area found by subtracting pattern 2 from pattern 1. In this example, Step S230 might then be run again, with the third pattern calculated to give more information about where the tag might be located within the area defined by the removal of pattern 2 area from pattern 1. While this example includes a detection and a non-detection, the same principles apply to two detections in a row. For example, if an RFID tag were detected in both pattern 1 and pattern 2, the RFID tag would be located within the intersection of pattern 1 and pattern 2 (again assuming no substantial movement between responses).

Preferably, tags read by the method 200 do not move significantly while being located; but if it is expected that tags will move significantly while being located, the method 200 may include detecting tag velocity and adjusting locating techniques appropriately (e.g., predicting where a tag will be based on previously measured velocity and attempting to locate it at the predicted location). Tag velocity may be detected in any number of ways, including by the steps previously mentioned. Altering antenna phase only slightly has an effect of essentially shifting the constructive interference pattern without substantially altering it; by shifting constructive interference patterns slightly tag velocity can be determined even if tag location is not definitely known. For example, if the method 200 confines tag location to a first set of points defined by a constructive interference pattern, generates a shifted pattern and detects the tag in a second set of points defined by a second constructive interference pattern, the average velocity of the tag between the generation of those two patterns falls into a bound set of solutions. By performing additional pattern generations and/or by including some assumptions (e.g., maximum velocity the tag can move at, direction of velocity, etc.) the tag velocity can be determined.

Step S240 includes receiving an additional response signal from the RFID tag. Step S240 is preferably substantially similar to Step S220. The results of the second response signal are preferably used in determining RFID tag position; the results may additionally be used to direct Step S230 (e.g., by identifying an area of interest to search in).

Steps S230 and Steps 240 are preferably iterated until RFID tag location has been suitably confined. In some cases, Steps S230 and S240 may be iterated a set number of times; for instance, there may be a set of constructive interference patterns that can, to a desired resolution, locate any tag within an area of interest (regardless of tag location within the area of interest) and Steps S230 and S240 may be iterated until this set has been completed. Additionally or alternatively, Steps S230 and Steps S240 are iterated along with an intermediate iteration of Step S250; for example, after each iteration of Step S230 and Step S240, Step S250 uses the results to further confine tag location and to direct parameters of the next iteration of Step S230, the iteration cycle continuing until Step S250 has suitably determined tag location (e.g., by reducing possible tag location area to an area below some threshold area).

Step S250 includes calculating the RFID tag position. Step S250 functions to determine or estimate where RFID tags are located based on responses to particular interference patterns. Step S250 is preferably iterated along with steps S230 and S240, but may additionally or alternatively be performed only after several iterations of Steps S230 and S240 or at any suitable time.

Step S250 preferably calculates RFID tag position by correlating RFID tag response or non-response to locations defined by constructive interference patterns. Step S250 preferably produces RFID tag position data from RFID tag response data and transmission parameter sets (e.g., whether a tag responded or not for a particular transmission parameter set) by generating a transmission power field estimate (or other distribution correlated to RFID response rates) based on the transmission parameter set.

The mapping between transmission parameter sets and transmission power fields is preferably set by Step S260, but may additionally or alternatively be set in any suitable manner. As described in Step S260, the mapping may vary solely on transmission power and phase (i.e., all other transmission parameters, including antenna location, and environmental variables are considered static) or the mapping may vary based on additional variables. For example, the mapping algorithm might also vary based on the number of people known to be in a particular area (changing the permittivity of the area, and thus the interference pattern) or based on antenna direction, if antenna direction is variable.

Step S250 may additionally or alternatively include calculating RFID tag position based on a combination of multiple locating methods (e.g., by locating an RFID tag to a particular area using a read probability method and then locating the tag within that area using STSRM).

Step S260 includes calibrating interference mapping. Step S260 functions to increase the accuracy of the mapping between antenna fields (specifically, super-threshold and sub-threshold areas) and location (relative to antennas or otherwise).

Step S260 preferably calibrates interference mapping by generating calibration references, which are then used to predict antenna fields (or a related metric, such as areas of super-threshold power). Calibration references may be pre-generated; for instance, calibration references may be formed by a robot with an RFID tag traversing an area; the robot maps out the area while one or more constructive interference patterns are generated by antennas. The robot map may be, through time synchronization, matched up to points of RFID tag activation, this data set is then compared to predicted data. Transmission parameters may then be adjusted (e.g., by adjusting transmission variable inputs to a prediction engine until prediction matches reality, or by adjusting actual transmission variable inputs until the robot output matches predictions). Pre-generated calibration references may be calculated in real-time with data gathering (e.g., as the robot moves around) or at a later time.

The calibration references may additionally or alternatively be generated in real-time (during operation of the method 200). In one example, RFID reference tags are placed in known locations. These may be used to generate calibration references at any time. This allows for easy recalibration when environmental factors (e.g., positioning of RF-signal-affecting objects, etc.) change.

These calibration references are preferably measured for a range of transmission parameters. In particular, calibration references preferably contain enough information to accurately calculate antenna fields for significantly varying transmission parameters (e.g., transmission phase and power from each antenna). In some cases, this may not mean actually measuring fields for wide ranges of all parameters. For instance, if the phase delay of signals is independent of transmission power for a particular environment, and the antenna transmission characteristics are well-known, an accurate calibration may not require many data points at different transmission powers.

Predicted fields are preferably generated by a modeling of the constructive interference fields based on calibration data collected as part of the method 200; additionally, the modeling may also be based on additional data. In one example, antenna fields for a particular set of transmission parameters not exactly sampled as part of calibration data may be predicted by interpolating calibration data. In another example, calibration data is used to model the permittivity (vs. coordinates) of a volume of interest, which are then used to predict antenna fields at any transmission power and phase.

Calibration may additionally or alternatively be performed with the aid of non-STSRM techniques. For example, persons in a particular area may carry RFID tags that identify them. If the position of the persons can be located with precision (e.g., by a camera, or by another method, such as detecting wireless transmissions from their cellphone), the RFID tags they carry could be used to generate calibration data. Cameras or other locating methods may additionally or alternatively be used at any point in the method 200 in order to refine or calibrate STSRM location data.

Step S260 may additionally include calibrating read probabilities by generating read probability references. Read probability references may be pre-generated; for instance, read probability references may be formed by a robot with an RFID tag traversing an area; the robot maps out the area while signals are output from one antenna (or serially from multiple antennas). The robot map, through time synchronization, may be matched up to points of RFID tag activation; this data may then be used to calculate read probabilities as a function of position in the area. As in the previous process, the transmission variables may be adjusted to match predictions to reality or vice versa. Read probability calibration processes may be performed in real-time with data gathering (e.g., as the robot moves around) or at a later time (using previously corrected data).

The description of the method 200 above provides examples directed to locating particular tags or of tags in a sparse environment; that is, scenarios where some amount of search is required to find a tag. A person skilled in the art will recognize that the method 200 is also applicable to systems where a large number of tags are located in some area, and the locations of many or all of those tags are of interest. In examples applying to such a situation, constructive interference patterns may not be generated to find a particular tag, but rather to provide the locations of all tags within a certain area; the strategy to locate all tags in an area (e.g., what patterns are generated and in what order) may be significantly different than a strategy to locate a single tag.

The method 200 is preferably performed by the system 100 but may additionally or alternatively be performed by any suitable system.

The methods of the preferred embodiment and variations thereof can be embodied and/or implemented at least in part as a machine configured to receive a computer-readable medium storing computer-readable instructions. The instructions are preferably executed by computer-executable components preferably integrated with an RFID tag locating system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

The disclosed embodiments are susceptible to various modifications and alternative forms, and specific examples thereof have been shown by way of example in the drawings and herein described in detail. It should be understood, however, that the disclosed embodiments are not meant to be limited to the particular forms or methods disclosed, but to the contrary, the disclosed embodiments are to cover all modifications, equivalents, and alternatives.

What is claimed is:

1. A method of locating a radio-frequency identification (RFID) tag with an RFID tag location system comprising a controller, a first antenna operably coupled to the controller, and a second antenna operably coupled to the controller, the method comprising:
    transmitting a first signal from the first antenna to the second antenna via a signal path between the first antenna and the second antenna;
    determining, by the controller, a delay and/or phase shift of the first signal along the signal path based on the first signal as received at the second antenna;
    transmitting a second signal from the first antenna to the RFID tag;
    receiving a response to the second signal from the RFID tag at the first antenna; and
    locating, by the controller, the RFID tag based the response and the delay and/or phase shift of the first signal.

2. The method of claim 1, wherein the delay and/or phase shift of the first signal is due to environmental factors affecting the signal path.

3. The method of claim 1, wherein determining the delay and/or phase shift of the first signal is based further on known relative locations of the first antenna and the second antenna.

4. The method of claim 1, further comprising:
    selecting a phase and transmission power of the second signal based on historical information related to a location of the RFID tag.

5. The method of claim 4, wherein the historical information comprises information about the location of the RFID tag as a function of time of day.

6. The method of claim 1, further comprising:
    calibrating the first antenna, the second antenna, and the controller with a reference RFID tag at a known location.

7. The method of claim 6, wherein calibrating the first antenna, the second antenna, and the controller comprises moving the reference RFID tag through a series of known locations.

8. The method of claim 1, further comprising:
    estimating, by the controller, a velocity of the RFID tag based on the response.

9. The method of claim 1, further comprising:
    interfering a third signal from the second antenna with the second signal from the first antenna to create an interference pattern causing the RFID tag to emit the response.

10. The method of claim 9, wherein the second signal has an amplitude below an activation threshold of the RFID tag, the third signal has an amplitude below the activation threshold of the RFID tag, and interfering the third signal with the second signal causes a portion of the interference pattern to have an amplitude above the activation threshold of the RFID tag.

11. A system for locating a radio-frequency identification (RFID) tag, the system comprising:
a first antenna to transmit a first signal and a second signal and to receive a response from an RFID tag to the second signal;
a second antenna to receive the first signal from the first antenna via a signal path between the first antenna and the second antenna; and
a controller, operably coupled to the first antenna and the second antenna, to determine a delay and/or phase shift of the first signal along the signal path based on the first signal as received at the second antenna and to locate the RFID tag based the response and the delay and/or phase shift of the first signal.

12. The system of claim 11, wherein the delay and/or phase shift of the first signal along the signal path is due to environmental factors.

13. The system of claim 11, wherein the controller is configured to determine the delay and/or phase shift of the first signal based on known relative locations of the first antenna and the second antenna.

14. The system of claim 11, wherein a phase and transmission power of the second signal are based on historical information related to a location of the RFID tag.

15. The system of claim 14, wherein the historical information comprises information about the location of the RFID tag as a function of time of day.

16. The system of claim 11, further comprising:
a reference RFID tag with a known identifier and a known location for calibrating the first antenna, the second antenna, and the controller.

17. The system of claim 11, wherein the controller is configured to estimate a velocity of the RFID tag based on the response.

18. The system of claim 11, wherein the second antenna is configured to interfere a third signal with the second signal from the first antenna to create an interference pattern, a portion of the interference pattern causing the RFID tag to emit the response.

19. The system of claim 18, wherein the second signal has an amplitude below an activation threshold of the RFID tag, the third signal has an amplitude below the activation threshold of the RFID tag, and the portion of the interference pattern has an amplitude above the activation threshold of the RFID tag.

20. The method of claim 1, further comprising:
transmitting a third signal to the RFID tag at a power level below an activation threshold of the RFID tag while transmitting the second signal to the RFID tag.

21. The system of claim 11, further comprising:
a third antenna, wherein at least one of the second antenna or the third antenna is configured to transmit a third signal at a power level below an activation threshold of the RFID tag while the first antenna transmits the second signal to the RFID tag.

22. A method of locating a radio-frequency identification (RFID) tag, the method comprising:
generating a first RFID tag activation signal having a first field pattern, the first RFID activation signal causing the RFID tag to emit a first response;
detecting the first response from the RFID tag;
generating a second RFID tag activation signal having a second field pattern different than the first field pattern, the second RFID activation signal resulting in no detection of a second response from the RFID tag; and
determining a location of the RFID tag based on a difference between the first field pattern and the second field pattern.

23. A method of locating a radio-frequency identification (RFID) tag with an RFID tag location system comprising a controller, a first antenna operably coupled to the controller, and a second antenna operably coupled to the controller, the method comprising:
transmitting a first signal from the first antenna to the RFID tag;
transmitting a second signal from the second antenna to the RFID tag;
receiving, by at least one of the first antenna or the second antenna, a response from the RFID tag to at least one of the first signal and the second signal; and
locating, by the controller, the RFID tag based the response to the second signal,
wherein at least one of the first signal or the second signal has an amplitude below an activation threshold of the RFID tag.

* * * * *